United States Patent [19]

Nagatomi et al.

[11] Patent Number: 4,595,800

[45] Date of Patent: Jun. 17, 1986

[54] KEY TELEPHONE SYSTEM

[75] Inventors: Kazuyuki Nagatomi; Rikio Sato, both of Tokyo, Japan

[73] Assignee: NEC Corporation, Tokyo, Japan

[21] Appl. No.: 651,414

[22] Filed: Sep. 17, 1984

[30] Foreign Application Priority Data

Sep. 20, 1983 [JP] Japan ................................ 58-173492

[51] Int. Cl.⁴ ............................................. H04M 3/00
[52] U.S. Cl. .................................. 179/99 R; 179/99 LS
[58] Field of Search .............. 179/99 R, 99 A, 99 E, 179/99 H, 99 LC, 99 LS, 99 M, 99 P, 18 AD, 18 ES, 81 R, 37, 18 B, 18 BB, 18 BE

[56] References Cited

U.S. PATENT DOCUMENTS

| | | | |
|---|---|---|---|
| 4,203,011 | 5/1980 | Coviello | 179/99 M |
| 4,277,649 | 7/1981 | Sheinbein | 179/18 B |
| 4,278,844 | 7/1981 | Jones | 179/18 B |
| 4,379,950 | 4/1983 | Ahmed | 179/18 ES |
| 4,453,040 | 6/1984 | Wolf et al. | 179/81 C |
| 4,491,693 | 1/1985 | Sano et al. | 179/99 R |
| 4,517,409 | 5/1985 | Nagasaki | 179/81 C |

OTHER PUBLICATIONS

Dodman, "Vantage 12: A Key Telephone System with Flexible Features", *Telesis*, 1982, vol. 1, pp. 30–37.

*Primary Examiner*—James L. Dwyer
*Attorney, Agent, or Firm*—Sughrue, Mion, Zinn, Macpeak, and Seas

[57] ABSTRACT

A key telephone system includes a plurality of key telephone stations, a switching network for selectively connecting the key telephone stations to CO/PBX lines or intercom lines, a system control unit and a system data memory unit, the system control unit controlling the key telephone stations and switching network in accordance with data stored in said system data memory unit. At least one of said key telephone stations is of the Class 2 type which can function in the normal operating mode and also in the system data setting mode wherein it operates as an input device for setting system data in the system data memory unit. The key telephone system further includes a menu data memory unit in which is stored a plurality of combinations of system data for each kind of service. The Class 2 key telephone station in the system data setting mode is operated by selectively depressing its push buttons to thereby load selected system data from the menu memory unit into the system data memory unit.

1 Claim, 12 Drawing Figures

| MENU NUMBER | | 25 | | | | | 26 | | | | --- |
|---|---|---|---|---|---|---|---|---|---|---|---|
| CO NUMBER | | 1 | 2 | --- | 5 | 6 | 1 | 2 | --- | 5 | 6 | --- |
| INTERCOM NUMBER | 1 | O | O | --- | O | O | O | O | --- | O | O | --- |
| | 2 | O | O | --- | O | | O | O | --- | | | --- |
| | 3 | O | | --- | O | | O | O | --- | | | --- |
| | ⋮ | ⋮ | ⋮ | ⋮ | ⋮ | ⋮ | ⋮ | ⋮ | ⋮ | ⋮ | ⋮ | --- |
| | 15 | | O | --- | | O | O | | --- | O | O | --- |
| | 16 | | O | --- | | O | O | | --- | O | O | --- |

FIG 9b

| | | 1 | 2 | 3 | 4 | 5 | 6 | 7 | 8 | --- |
|---|---|---|---|---|---|---|---|---|---|---|
| TYPE OF LINE | CO LINE | O | | O | | O | | O | | --- |
| | PBX EXTENSION | | O | | O | | O | | O | --- |
| ONE PULSE DIALING | YES | O | O | | | O | O | | | --- |
| | NO | | | O | O | | | O | O | --- |
| PAGING GROUP | TWO ZONES | O | O | O | O | | | | | --- |
| | THREE ZONES | | | | | O | O | O | O | --- |
| | ⋮ | ⋮ | ⋮ | | | | | | | ⋮ |

KEY TELEPHONE SYSTEM

BACKGROUND OF THE INVENTION

The present invention relates to a key telephone system, and more particularly to a key telephone system having the ability to set system data into the system data memory unit by operating the push-buttons of a specific one of a plurality of key telephone stations.

A key telephone system is a customer-controlled telephone switching system capable of using more than one line by operating service selection push buttons or keys arranged on a single telephone station set. Efficient utilization of lines in an office is thereby enhanced.

System data defining the system operation of a key telephone station usually differ from office to office. Accordingly, system data are set by push-button operation by the supplier of the key telephone system as required by the customer managing the office when the system is installed. Such system data include a ringing assignment for designating the key station sets to emit a ringing tone in response to an arriving call on each CO line, a call restriction assignment for designating whether or not a call may be originated from each key station to set to a CO line, various timer value assignments used in a key telephone system, and assignments of a paging group, a prime line pick-up, a private line, a CO line scan, a door phone and a door phone chime. A system data memory is provided and divided into blocks, each of which is assigned to similar system data wherever practicable. Each block includes a plurality of 1-byte memories each of which can be designated by a memory address.

Figure 1:
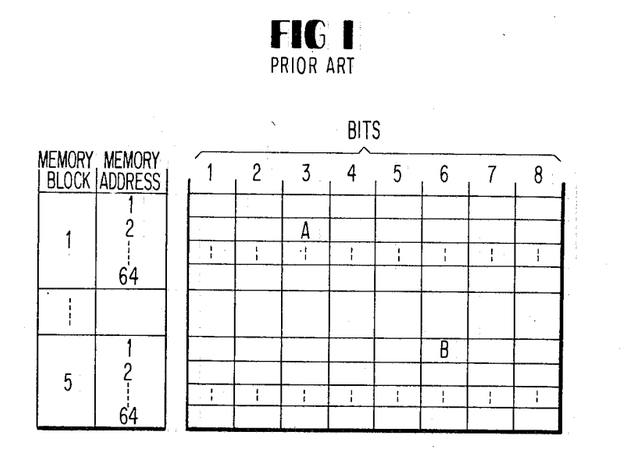
FIG. 1 is a diagram illustrating the relations between memory blocks and memory addresses in a systems data memory.

Referring to FIG. 1, if for instance a timer counter of one kind or another is to be set, first memory block "1" will be designated. If the timer is a hooking timer, then memory address "1" will be designated to set data relative to the station sets and the hooking timer. Or if the timer is a pause timer, memory address "2" can be designated within memory block "1" to set the relevant data concerning pause timing for each station set.

Figure 2:
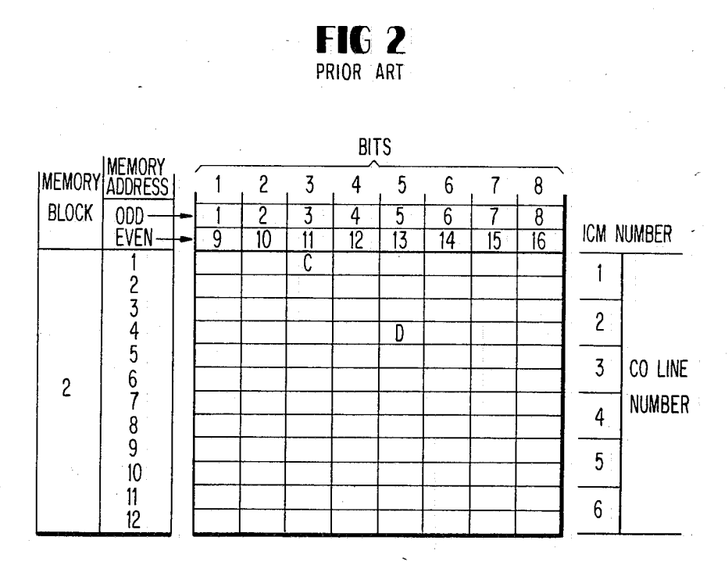
FIG. 2 is a diagram illustrating the relations between memory blocks and memory addresses in a systems data memory and the relations between station set numbers and CO line numbers when ringing assignment is to be achieved.

Referring now to FIG. 2, if the number of CO lines is six and that of station sets is 16, memory block "2" and memory address "1" will be designated to assign either "0" or "1" for each of the eight bits of the memory address, to thereby designate call arrival tones for the first through eighth station sets with respect to the first CO line. Then, by designating memory address "2", data will be assigned for each of the bits corresponding to that memory address to designate call arrival tones for the ninth through 16th station sets with respect to the first CO line. For the second through sixth CO lines, memory addresses "3" and "4" through "11" and "12" will be respectively designated to assign data for the bits of the corresponding addresses.

System data setting is accomplished by switching one of the key station sets from the normal operation mode to the system data setting mode by operating that station's push-buttons. The key station set used for system data setting has the same operational panel and button arrangement as all other key station sets, and its buttons, used for various services in the normal operation mode, are employed for block address and memory address designation and data writing in the system data setting mode.

Figure 3:
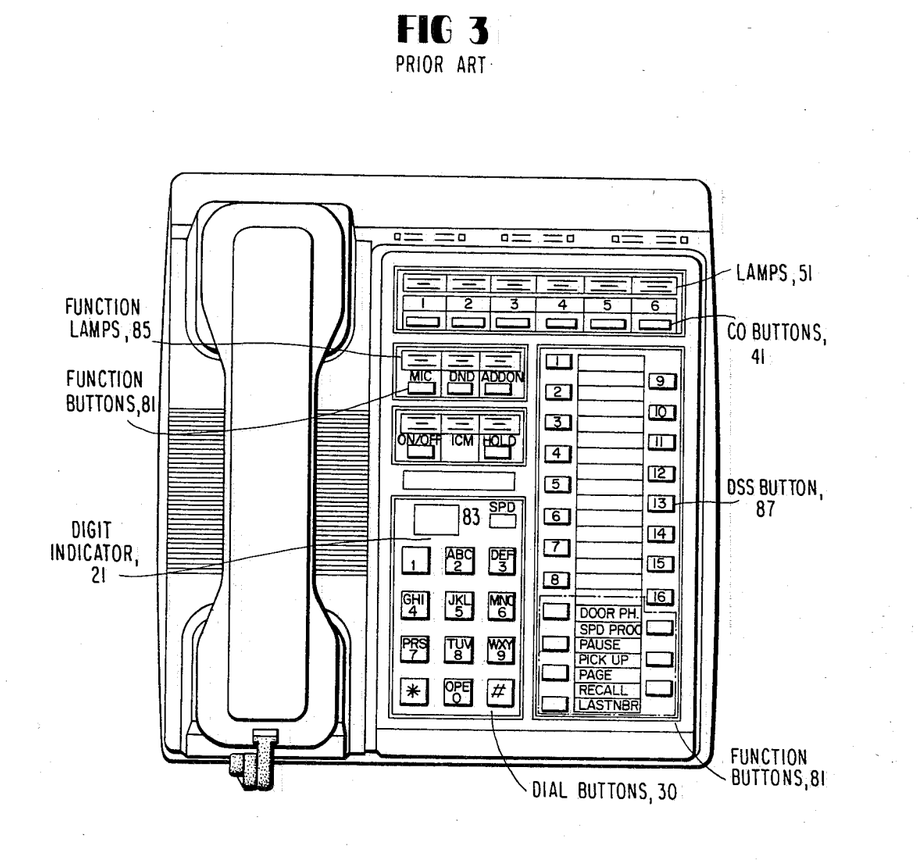
FIG. 3 is a plane view of the arrangement of buttons, lamps and the like on the panel face of a key station set.
Figure 4:
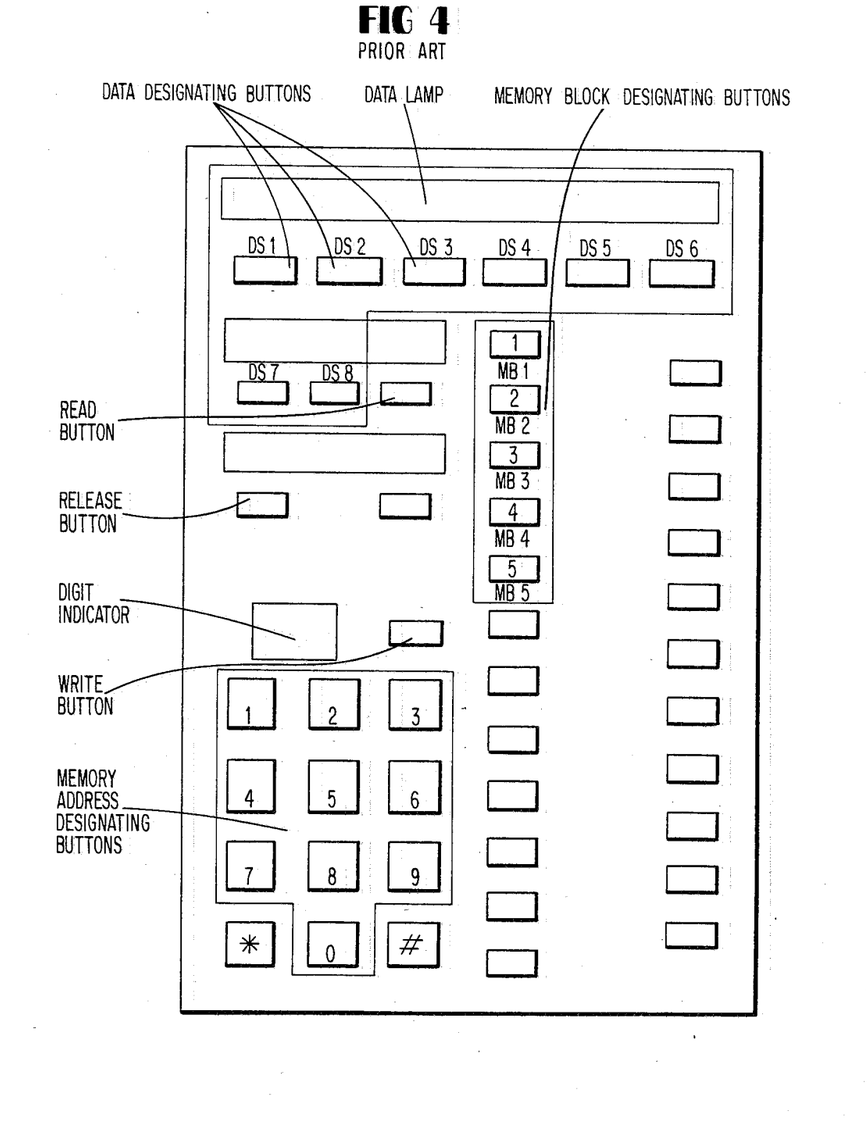
FIG. 4 illustrates the conventional functions of various buttons on a key station set in its system data setting mode.

FIG. 3 illustrates the arrangement of various service buttons, dial buttons, CO buttons and direct station selection (DSS) buttons in the normal operation mode of a key telephone station set. In the system data setting mode, these buttons serve the purpose of designating the functions shown in FIG. 4. Thus the DSS buttons are used for memory block designation, the dial buttons (ten keys) for memory address designation, and the CO buttons for writing the data assigned for each bit.

In the ringing assignment described above, for example, the function of each button in the system data setting mode is entirely unrelated to that in the normal operation mode, either in denomination or in label. Therefore, the operator responsible for system data setting has to operate the buttons correctly in accordance with a prepared table of address and data. This is a highly confusing procedure.

Ringing assignment and call restriction have to be frequently altered in connection with changes in office layout or personnel arrangement. The total absence of and relationship, in denomination or label, between the functions of buttons in the system setting mode and those in the normal operating mode makes it even more difficult for the customer to himself reset the system data.

SUMMARY OF THE INVENTION

An object of the present invention is to provide a key telephone system which permits a substantial part of the system data to be set by simply operating a key telephone station's push-buttons, to thereby facilitate data setting and maintenance.

According to the invention, there is provided a key telephone system including a plurality of Class 1 key telephone stations, a switching network for connecting the key telephone stations to C/PBX or intercom telephone lines, and system control means for controlling the key telephone stations and said switching network in accordance with system data stored in system data memory means.

The key telephone system according to the invention further includes a Class 2 key telephone station having, when operating in the normal mode, the same functions as the Class 1 key telephone stations and functioning, when in the system data setting mode, as input means for setting system data into the system data memory means, and menu memory means in which are stored in advance a plurality of combinations of system data, prepared for each kind of service.

The switching network, each station and each interface are controlled by the system control means, on the basis of system data selected from the system data memory means in the normal operation mode. The system data memory means are loaded with system data selected from the menu memory means by operating the push-buttons of the Class 2 key telephone station when it is in the system data setting mode.

According to the present invention, a plurality of assignment data are incorporated in the menu for each kind of service, such as ringing or call restriction, and stored in the memory. By simple push-button operation, specific sets of assignment data are selected, and their combination is used as systems data.

DETAILED DESCRIPTION OF THE PREFERRED EMBODIMENTS

Figure 5:
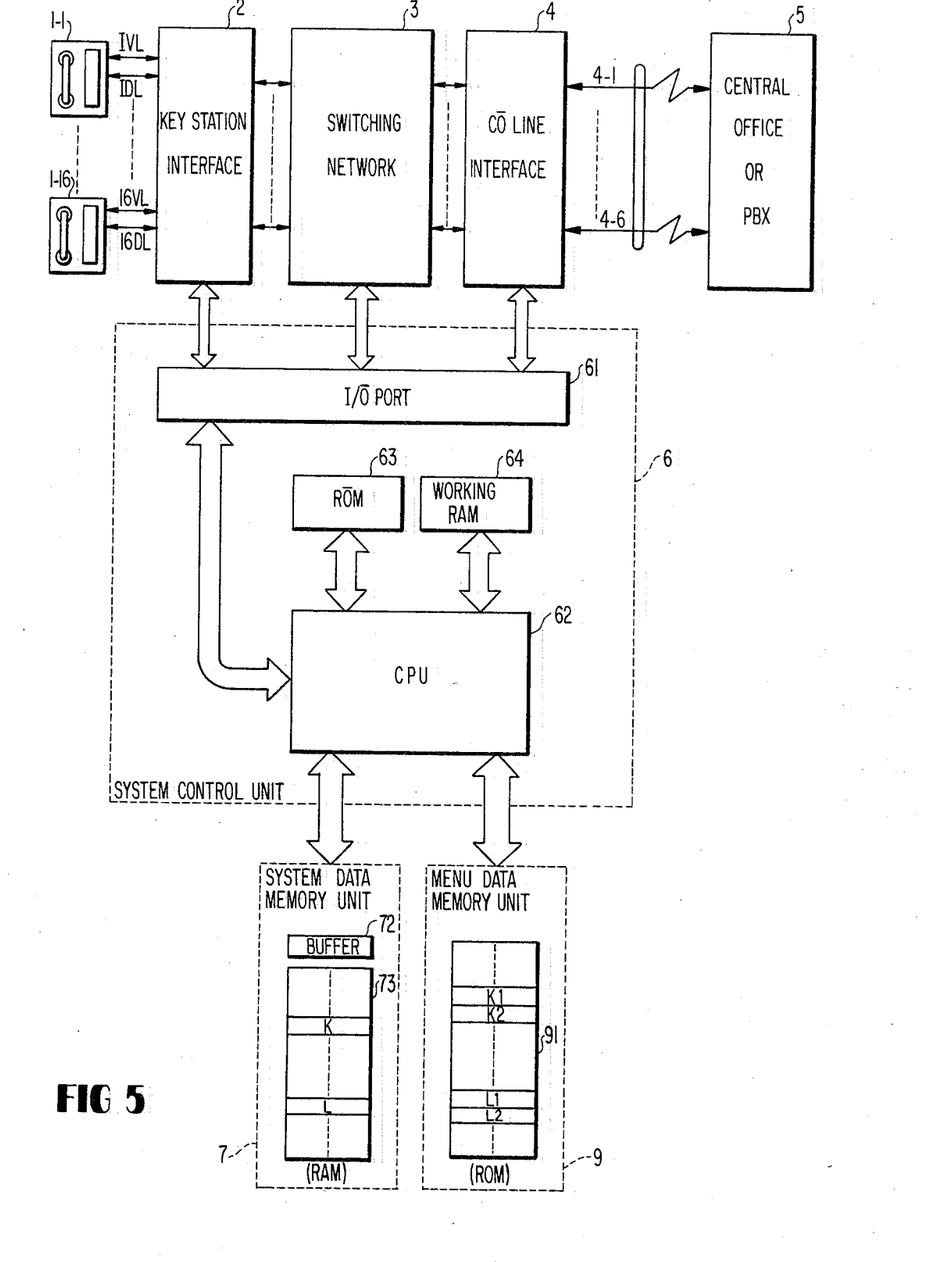
FIG. 5 is a block diagram illustrating a key telephone system according to the present invention.

Referring to FIG. 5, a key telephone system 100 includes a plurality of key telephone station sets 1—1, . . . , 1-16, a switching network 3, a system control unit 6, a system data memory unit 7 and a menu data memory unit 9. The establishment of voice paths between the key telephone station sets and CO lines 4-1 to 4-6 is achieved via voice lines VL1 to VL16, a key station interface 2, the switching network 3 and a CO line interface 4. The key telephone station sets are also connected to an input/output (I/O) port 61 in the system control unit 6 via data lines 1DL to 16DL and the key station interface 2. The transmission and reception between the key telephone station sets and the system control unit is achieved by way of this route. The CO interface 4 also is connected to the system control unit 6 via the I/O port. The presence or absence of an arriving call is detected at the CO line interface 4, and made known to the system control unit 6. Thereafter ringing is performed at the CO interface upon instruction from the system control unit.

The system control unit 6 includes a central processing unit 62, a read-only memory (ROM) 63 in which the operational program of the central processing unit (CPU) is stored, a working random access memory (RAM) 64 for storing various data during operation, and the I/O port 61. The system control unit 6 controls the switching network 3, the key station interface 2 and the CO line interface 4 on the basis of the program stored in the ROM 63 and the data set in the system data memory.

Referring again to FIG. 3, on the control panel of the key telephone station set 1-1 are arranged dial buttons 30, CO buttons 41, DSS buttons 87 and off-line service buttons (function buttons) 81. Lamps 51 are provided in one-to-one correspondence with the CO buttons 41. Lamps 85 are provided in one-to-one correspondence with the function buttons 81, each lamp representing one status. When a CO call is to be made in the normal operation mode, one of the CO buttons 41 is pressed to connect the key telephone station to the CO line corresponding to that button, and then dial buttons 30 are pressed to call the other party. When an intercom call is to be made, one of the DSS buttons is pressed, and the station set corresponding to that button is called. In response to these push-button operations, data are transmitted via the key station interface 2 and the I/O port 61 to the CPU 62, which controls the switching network 3, the CO interface 4 and the key station interface 2 on the basis of the program stored in the ROM 63 and the system data stored in the system data memory unit 7. The key station interface 2 transmits to telephone station sets data for turning on or off the lamps. When a call arrives, a CO lamp is intermittently lit, and the corresponding CO button is pressed to control the connection to the CO line.

The system data memory unit 7 includes a buffer memory 72, and a system data memory 73. The memory areas in the system data memory 73 are accessible in the manner illustrated in FIG. 1. Thus it is a memory in which, after the block and then the address are designated, data are written into, or read out of, the eight bits of the address.

The system data memory 73 consists of a plurality of memory areas. For instance, memory area K is for ringing assignment use, and memory area L is for call restriction assignment use. Other areas are used for other assignments. The buffer memory 72 temporarily stores eight-bit data belonging to one address.

The menu data memory unit 9 includes a read-only memory (ROM) 91 for storing various system data. The ROM 91 consists of a plurality of memory areas, each accessible by a ROM area address. For instance, in memory area K1 is stored a first ringing assignment and in memory area K2, a second ringing assignment. These two assignments designate different station sets to ring in response to a call on a CO line. Further in memory area L1 is memorized a first call restriction assignment and in memory are L2, a second call restriction assignment. These two call restriction assignments, differing from each other, restrict calls from station sets in a different way. In other memory areas are stored other service assignments.

Figure 6:
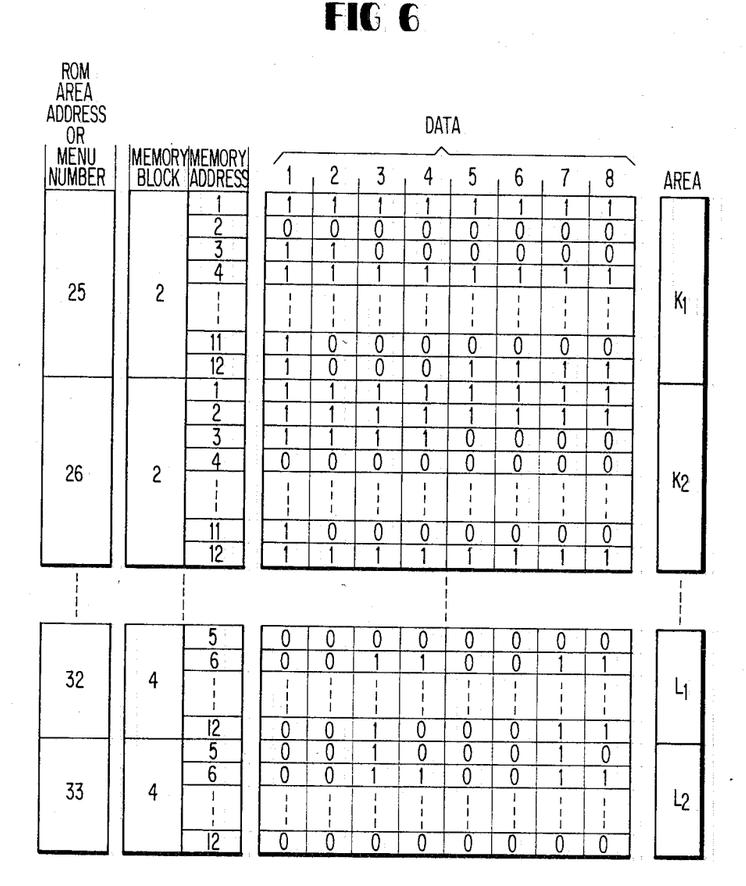
FIG. 6 shows the layout of data vis-a-vis menus and data memory area addresses.

FIG. 6 shows an example of data layout for ROM 91 area addresses in the menu data memory unit 9. In memory areas K1 and K2 to be respectively called by ROM area addresses 25 and 26, there are stored the tables of the first and second ringing assignment data in conformity with the rules earlier explained with reference to FIG. 2, together with RAM 73 address information (memory blocks and memory addresses) of the system data memory unit 7. Thus in ROM area addresses 25 and 26 are memorized memory block "2", memory addresses "1" to "12" belonging thereto and eight-bit data belonging to each memory address. By selecting "1" for the first eight bits belonging to the odd-number memory addresses of memory block "2", the ringing of the first eight stations sets 1-1 through 1-8 is assigned. Similarly, by selecting "1" for the second eight bits belonging to the even-number memory addresses of memory block "2", the ringing of the second eight station sets 1-9 through 1-16 is assigned. The pair of memory addresses "1" and "2" corresponds to CO line number 4-1. Further the pairs of memory addresses "3" and "4", "5" and "6", "7" and "8", "9" and "10", and "11" and "12" correspond to CO line numbers 4-2, 4-3, 4-4, 4-5 and 4-6, respectively.

In memory areas L1 and L2 to be respectively called by ROM 91 area addresses 32 and 33, there are stored the tables of the first and second call restriction assignment data together with RAM 73 address information (memory blocks and memory addresses) of the system data memory unit 7. Thus in ROM area addresses 32 and 33 are memorized memory block "4", memory addresses "5" to "12" belonging thereto and eight-bit data belonging to each memory address.

Memory areas L1 and L2 are divided into two groups. Eight bits are held by each of the memory addresses "5" to "12" of memory "4", and the call restriction assignment of each station set is accomplished with the first or second four bits. Thus, the call restriction assignment of station set 1-1 is assigned with the first through fourth bits of memory address "5", that of station set 1-2, with the fifth through eighth bits of same. Similarly, data for the call restriction of station sets 1-3, 1-4, ..., 1-15, 1-16, are entered as four bits each into the first four bits of memory address "6", the second four bits of same, ..., the first four bits of memory address "12", and the second four bits of same, respectively. Thus data are stored in the corresponding four bits of said memory addresses, for instance with code "0000" applyng to the total absence of call restriction on any CO line from the station sets, code "0011" to the call restriction on every CO line from the station sets (i.e. only incoming calls are permitted), or code "0010" to restriction of out-of-town and international calls on every CO line.

According to the present invention, a specific combination of assignment data is taken out of various combinations of service assignment data stored in the menu data memory unit 9 at the time of the installation of the key telephone system or when, after its installation, an alteration has become necessary, and that combination of assignment is set as one of the combinations of system data. The setting of assignment data is achieved by a specific one of the station sets, for example the station set 1-1.

Figure 7:
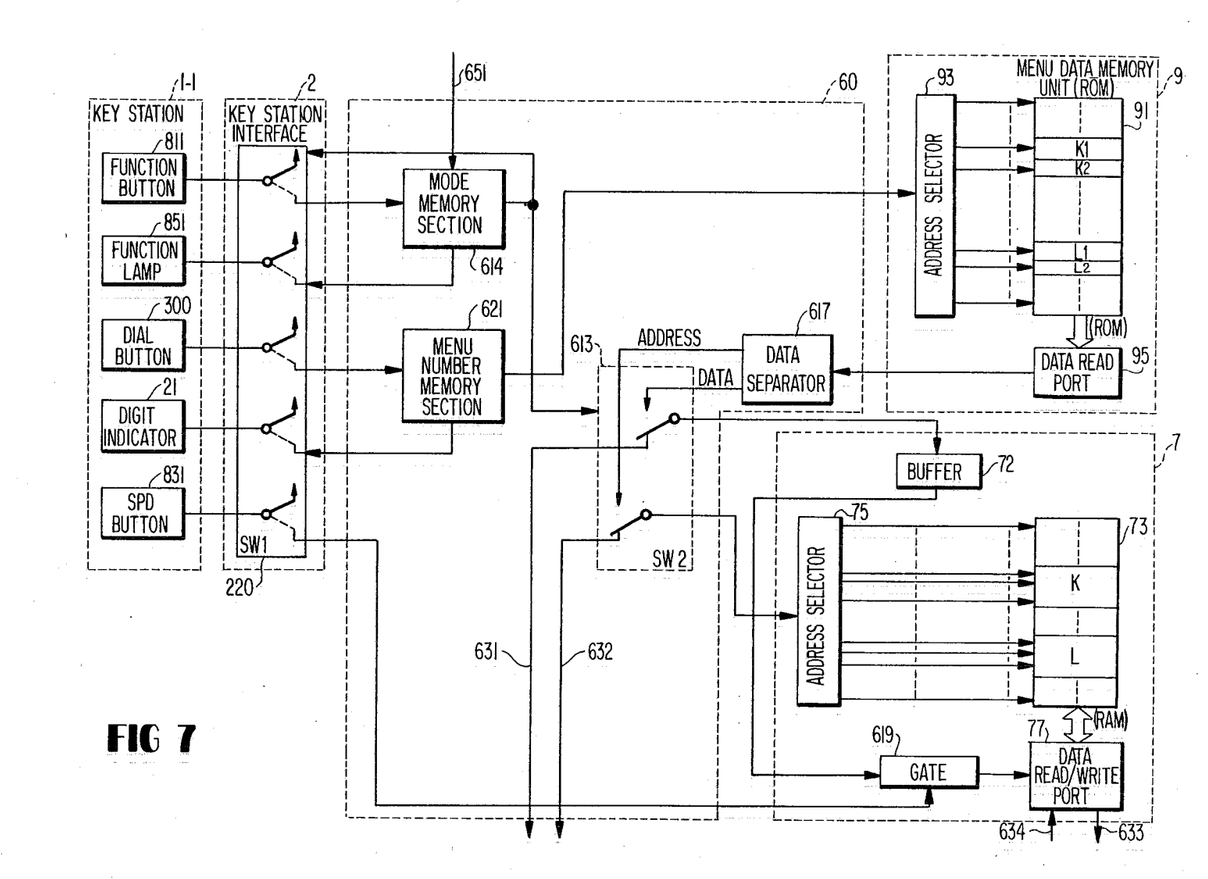
FIG. 7 is a block diagram illustrating the connection of a key station set 1—1 to a menu data memory unit and a system data memory unit in the system data setting mode.

FIG. 7 illustrates the case wherein the key telephone station set 1-1 is isolated by its own push-button operation from the switching network and functions as a system data input device, by connecting the key station set 1-1 to the system data memory unit 7 and the menu data memory unit 9. While in actual practice the data line between the key telephone station set 1-1 and the key station interface 2 is connected by one line pair, and each combination of data is transmitted and received on a time division basis, the arrangement illustrated in FIG. 7 shows a five-line set-up for the convenience of description.

A function button unit 811 of the key station 1-1 includes function buttons for use in the normal operation mode and a generator of button identification codes. A dial button unit 300 includes dial button identification codes besides dial buttons. A function lamp unit 851 includes function lamps, corresponding to function buttons, and a decoder. A digital indicator 21 is a two-digit indicator. An SPD button unit 831 includes, besides an SPD button 83, a circuit for generating the code of that button. The SPD button unit 831, which assigns automatic dialing by speed dial button operation in the normal operation mode, serves in the system data setting mode as an entry button used for giving an instruction to write menu data into the system data memory unit 7.

Only a portion of the key station interface 2 namely, the portion 220 for switching the key station interface into the system data setting mode, is shown in the diagram. In the data setting mode, every switching contact is set to connect the key station set 1-1 to a block 60 of the system control unit 6, the circuity of block 60 being involved in system data setting.

The functional subblocks of block 60 will now be explained. The memory section in this block 60 is included in the working RAM 64, and the rest, in the CPU 62. In response to a system data setting mode detection signal on a line 651, a mode memory section 614 generates signals to set each contact of the key station interface 2, and those of a switch 613, to the system data set mode position. A further signal from mode memory section 614 commands the flashing of an ON/OFF lamp among the function lamps. It also resets the contacts of these switches in response to a signal to release this mode.

A menu number memory section 621 stores a code indicated by the dial button, and at the same time supplies this code to a digit indicator 21 and an address selector 93 of the menu data memory unit 9.

A data separator 617 separates address information and data from signals supplied from the menu data memory unit 9. The address information of the data separator 617 is supplied by way of a switch 613 to an address selector 75 of the system data memory unit 7. Meanwhile the data is supplied to the buffer 72 of the data memory unit 7 via the switch 613.

The menu data memory unit 9 includes the ROM 91 in which menu data are stored, an address selector 93 for selecting ROM area addresses and a data read port 95.

The system data memory unit 7 includes the RAM 73 for storing system data, the address selector 75 for selecting RAM addresses, a data read/write port 77, the buffer memory 72 and a gate 619.

Next will be described the setting of selected data from the menu data memory unit 9 into the system data memory unit 7 with reference to FIGS. 3, 7 and 8a to 8c together.

As ADD, ON, ON/OFF and SPD PROG buttons (function buttons) of a key telephone station set are successively operated, the system control unit identifies its being in the system data setting mode (step 180), and notifies the mode memory section 614 of that fact. This mode memory section 614 makes the contacts of switches 220 and 613, and generates a signal to flash one of the ON/OFF function lamps (step 182). As a menu number is indicated by pressing dial buttons with two digits (step 190), the menu number memory section 621 generates a ROM area address representing a menu number and supplies it to the address selector 93, where it is latched. Data included in the area address selected by the selector 93 are read by the data read port 95, and separated by the data separator 617 into address information for the RAM and system data. The address information is latched to an address selector 75. Meanwhile the system data are stored in the buffer memory 72 by way of the switch 613 (step 192). As the SPD button is operated (step 196), its code is supplied to the gate 619, which then opens. Data stored in the buffer memory 72 are written, via the data read/write port 77, into a RAM address selected by the address selector 75 (step 198).

As the ON/OFF button of the function buttons is operated, the mode memory section 614 detects the release of the system data setting mode, and breaks the contacts of the switches 220 and 615. The ON/OFF lamp is thereby extinguished, and the digit indicator 21 is turned off, the mode being switched to system operation (step 200).

Figure 8A:
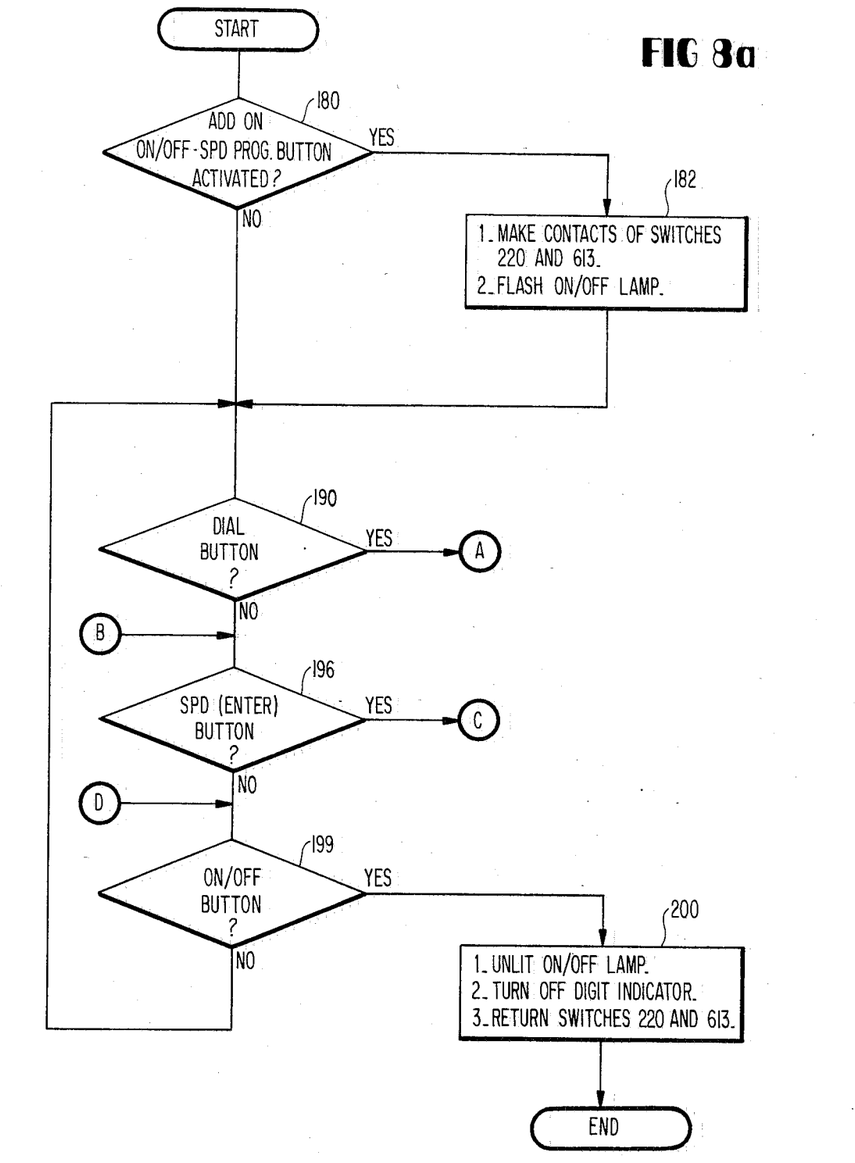
FIGS. 8a to 8c are flow charts for the system data setting mode.
Figure 8B:
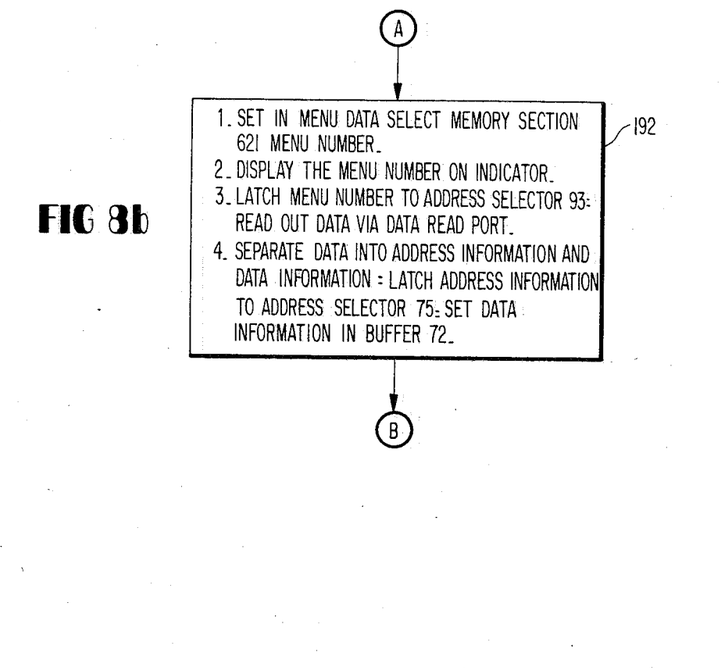
Figure 8C:
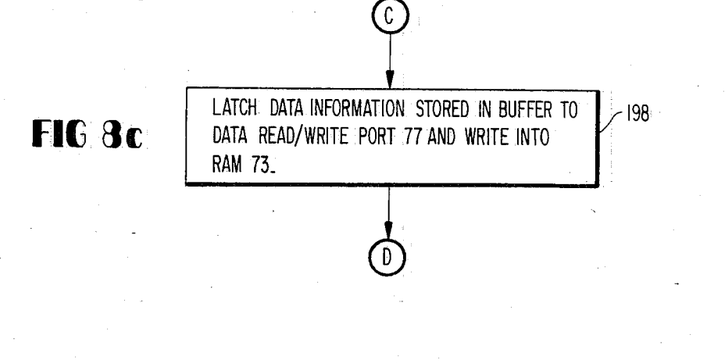

Unless the ON/OFF button is operated, another combination of system data can be selected by the loop of steps 190, 192, 196, 198 and 190 out of the menu, and written into another address in the system data memory unit.

In this manner, every time it becomes necessary to set or alter the system data, a combination of system data can be set merely by reading suitable menu data and copying them into the system data memory unit.

For instance, alteration of the first ringing assignment and the second call restriction assignment, in connection with a partial change in office layout or a personnel reshuffle or promotion within the office, can be achieved by switching to the system data setting mode according to the above described flow, selecting a ROM area address 25 with the dial buttons, writing the selected data into the memory area K of the RAM, then selecting a ROM address 33 with the dial buttons, and writing the data therein into the memory area L of the RAM.

Whereas the foregoing embodiment was described specifically with respect to ringing assignment and call restriction assignment data, menus for other service assignments, too, are of course stored in the ROM 91, and the data contained therein are set in the system data memory unit 7 as required.

System data set in the system data memory unit 7 as stated above are usually loaded into the working RAM 64 of the system control unit at the beginning of the operation mode. The CPU 62, referring to the system data stored in the RAM 64, controls the switching network 3 and interfaces 2 and 4 according to the program of ROM 63. Into the working RAM 64 are loaded, through the data read/write port 77 and a line 633, data selected by the address selector 75 in response to address information supplied to a line 632. A line 634 is intended for write/read control.

In the absence of the optimal data in the menu data memory, the data closest to the optimal may be loaded into the system data memory unit, with a minor change made by operating the buttons on the key telephone station set. In this instance, necessary address information supplied via the line 632 and altered data supplied via the line 631 are written into the desired address in the RAM 73 via the buffer 72, gate 619 and data read/write port 77.

When setting menu data in the system data memory, the customer selects the desired menu data out of the data stored in the menu data memory by operating the buttons with reference to a visible feature assignment menu.

Figure 9A:
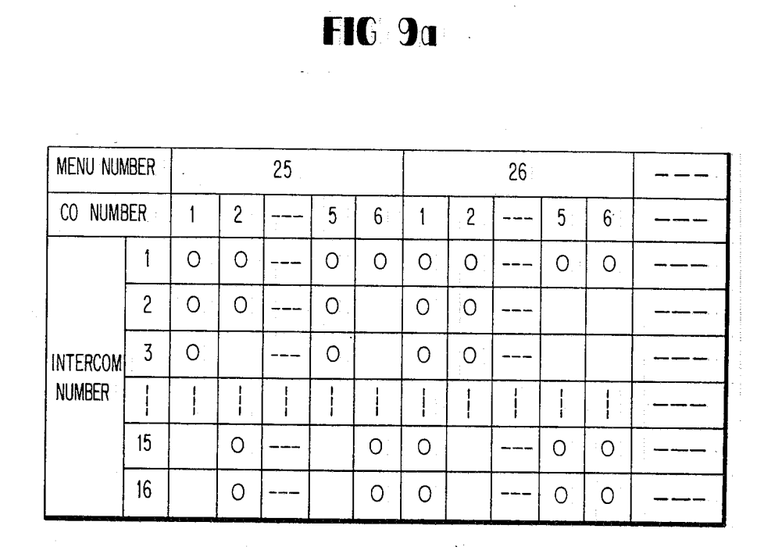
FIGS. 9a and 9b show examples of a menu.

FIG. 9a is a visible menu concerning the ringing assignments of station sets corresponding to individual CO lines when numbers 25 and 26 are selected. Ringings, each marked with a "0" sign, are memorized as shown in the upper part of FIG. 6.

Though a similar menu is also prepared for call restriction assignments, its description is dispensed with herein for the sake of brevity.

Figure 9B:
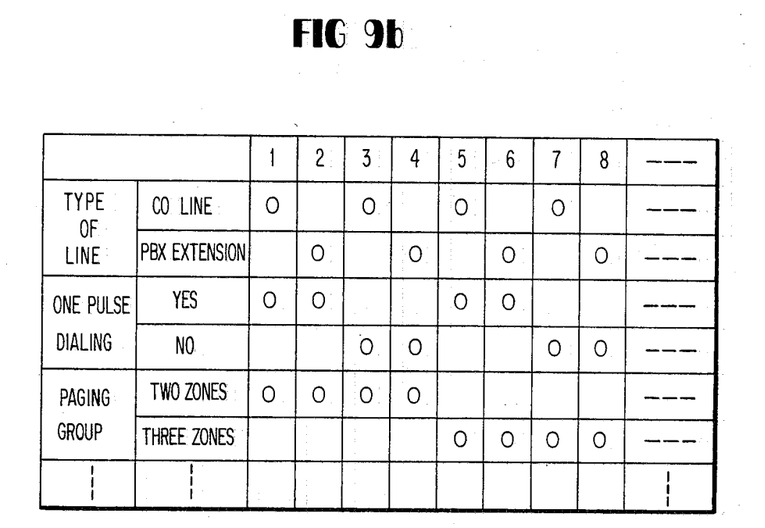

FIG. 9b shows an example in which area addresses "1" through "8" are allocated for all of the eight possible combinations of three service features: type of line (external call or PBX extension), one pulse dialing (20 pps or not) and paging group (two possible zones or three). The positions marked with "0" are where code "1" is written in the memory unit. If a desired push-button telephone set is connected to a PBX extension line, a dial speed of 20 pps is possible and two zones of paging group are available, ROM area address "2" will be set.

According to the present invention, a key telephone system is so structured that, for the initial setting of system data for normal system control to meet the requirements of the customer, place of installation and usual users, a memory unit for the menu of the conditions to be set is provided, the system control unit calls with a calling code a suitable combination of data out of the menu and write in such data as the system data to be stored, and thereby are realized the advantages of easier writing and maintenance.

We claim:

1. A key telephone system including a plurality of key telephone stations of a first type, a switching network for connecting said key telephone stations to CO/PBX or intercom telephone lines, and system control means for controlling said key telephone stations and said switching network in accordance with system data stored in system data memory means, and further including a key telephone station of a second type operable in a first mode as a key telephone station of the first type and in a second mode as an input means for setting system data in said system data memory means, and menu memory means in which are stored in advance a plurality of combinations of system data, prepared for each kind of service, wherein said system control means effects control, on the basis of system data selected to control operation of the key telephone stations as key telephone stations of the first type, by loading said system data memory means with system data selected from said menu memory means by push-button operation of said key telephone station of the second type in said system data setting mode;

wherein said key telephone station of the second type includes function buttons generating function codes and dial buttons generating numerical codes; said system control means includes a mode memory section for designating either said first mode or said second mode, and a menu number memory section, responsive to said dial buttons for designating a menu number, the contents of which re to be written into the system data memory means; said menu memory means including a read only memory array, a data read port, and an address selector responsive to the menu number stored in said menu number memory section and;

wherein said system data memory includes a random access memory array, an address selector responsive to address information from a selected menu address for addressing areas in said random access memory array, a data read/write port, a buffer memory storing data from the selected menu address, gate means responsive to a function button of said key telephone station of the second type for selectively passing data stored in said buffer means to said data read/write port, whereby data from the selected menu address is written into the random access memory array at the address designated by said system data address selector in response to address information received from the selected menu address.

* * * * *

UNITED STATES PATENT AND TRADEMARK OFFICE
CERTIFICATE OF CORRECTION

PATENT NO. : 4,595,800
DATED : June 17, 1986
INVENTOR(S) : K. NAGATOMI et al

It is certified that error appears in the above-identified patent and that said Letters Patent is hereby corrected as shown below:

Column 2, Line 34    "to C/PBX"

should read

--to CO/PBX--

Column 5, Line 62    "2 namely,"

should read

--2, namely,--

Signed and Sealed this

Eighteenth Day of November, 1986

Attest:

DONALD J. QUIGG

*Attesting Officer*        *Commissioner of Patents and Trademarks*